Jan. 3, 1928.
J. T. LANDGRAF
1,655,274
CLEANABLE POULTRY FOUNTAIN
Filed May 19, 1927   2 Sheets-Sheet 1
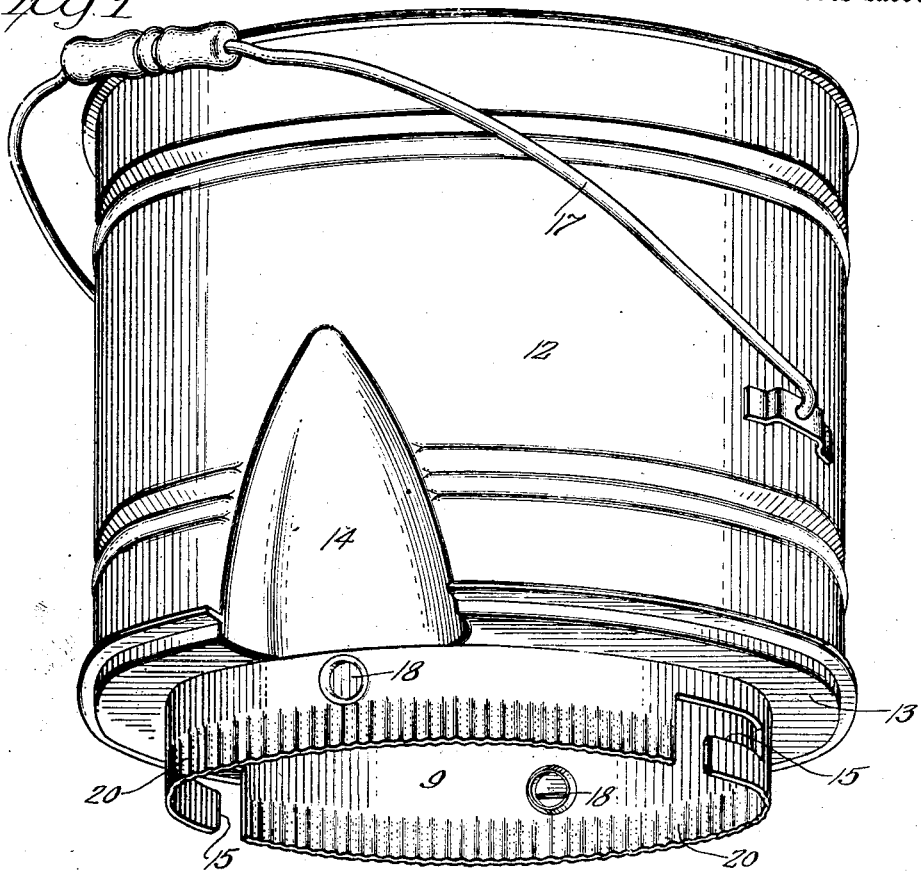
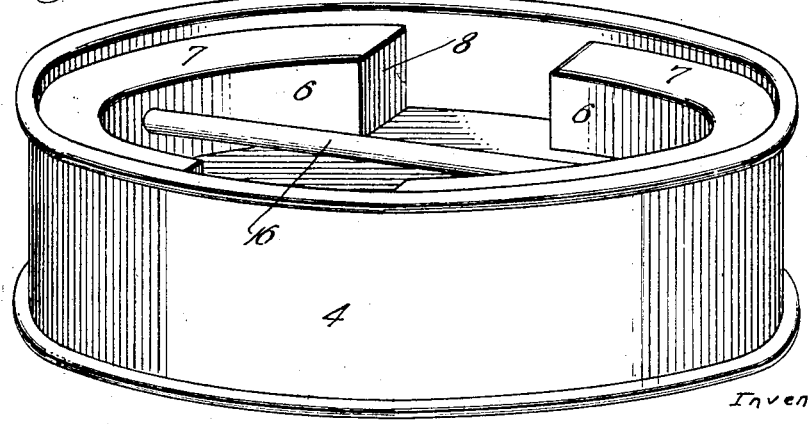
Inventor:
Jacob T. Landgraf
by Albert Scheible
Attorney Jan. 3, 1928.
J. T. LANDGRAF
1,655,274
CLEANABLE POULTRY FOUNTAIN
Filed May 19, 1927 2 Sheets-Sheet 2
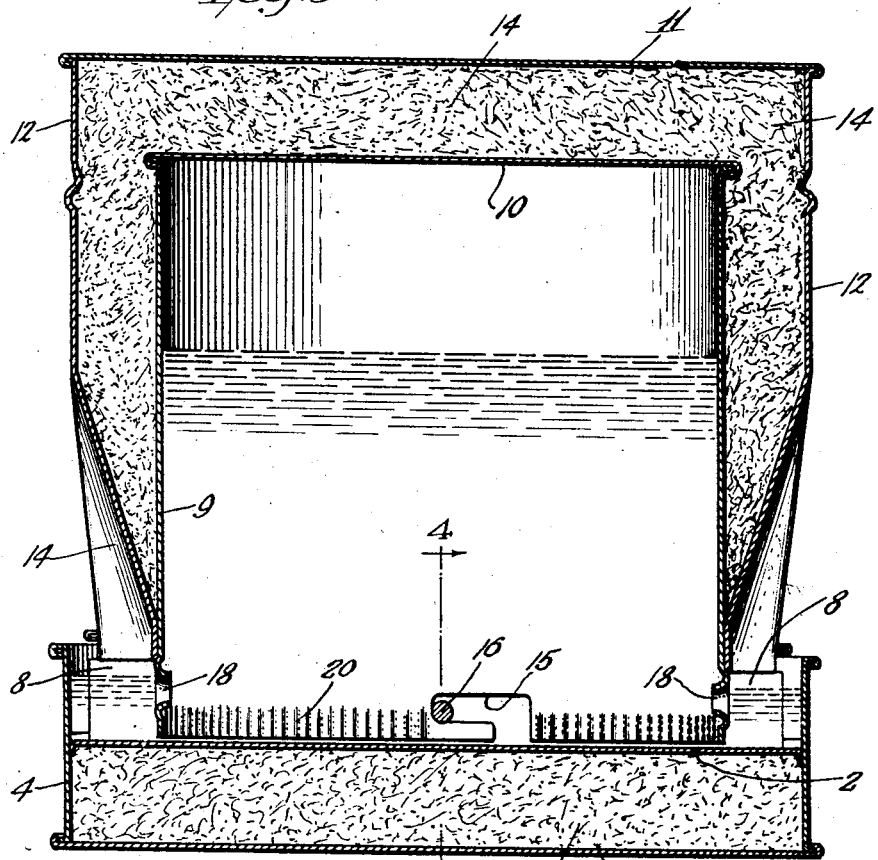
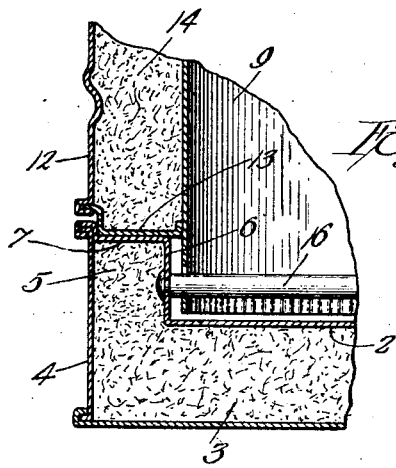
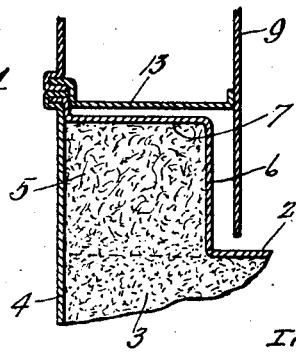
Inventor:
Jacob T. Landgraf
by Albert Scheible
Attorney Patented Jan. 3, 1928.

1,655,274

UNITED STATES PATENT OFFICE.

JACOB T. LANDGRAF, OF MACOMB, ILLINOIS, ASSIGNOR TO AMERICAN STEEL PRODUCTS CO., OF MACOMB, ILLINOIS, A CORPORATION OF ILLINOIS.

CLEANABLE POULTRY FOUNTAIN.

Application filed May 19, 1927. Serial No. 192,564.

My invention relates to poultry fountains of the general type in which a reservoir of water maintains a supply of water at a predetermined height in one or more wells which are readily accessible to the chickens.

In its general objects, my invention aims to provide a constant level appliance of this class in which the reservoir (or water container) can readily be detached from the base portion to permit this reservoir to be cleaned, in which the base portion can be securely latched to the reservoir while the latter has its mouth upwardly directed, and in which the latching or unlatching of one of these portions with respect to the other can be effected by simple relative rotational movements.

My invention also provides an appliance for this purpose in which the water in the reservoir is effectively jacketed by heat-insulating material, and in which the bottom and ends of each well is similarly jacketed so as to minimize the possible freezing of the water in cold weather. Furthermore, my invention provides a construction employing strong and simple means for securing the base portion to the reservoir, and aims to dispose the interlocking parts so that they will not interfere with free access by the poultry to the wells.

Still further and also more detailed objects will appear from the following specification and from the accompanying drawings, in which Fig. 1 is a perspective view of the reservoir detached from the base portion, looking slightly upward.

Fig. 2 is a perspective view of the base portion alone.

Fig. 3 is a central and vertical section through the entire poultry fountain, taken through the wells of a two-fountain embodiment comprising the base portion of Fig. 2 and the container portion of Fig. 1.

Fig. 4 is a fragmentary central and vertical section taken at right angles to Fig. 3, as indicated by the line 4—4 of Fig. 3.

Fig. 5 is a fragmentary section, similar to a portion of Fig. 4, showing a modified disposition of interengaging parts of the container portion and the base portion.

In the illustrated embodiment, the base portion includes a base plate 1, a false bottom 2 at some distance above this base plate, a filling 3 of heat-insulating material (such as granulated cork) between the base plate and the false bottom, and a peripheral wall 4 laterally housing the heat insulation. The wall 4 is clinched to the base plate 1 and secured to the false bottom 2 to support the latter, and this peripheral wall 4 extends for a considerable distance above the false bottom, so that the base portion in so far as it has thus been described would constitute a shallow cup with a thermally insulated bottom. This cup-shaped structure is lined adjacent to its periphery by arcuate insulations 5 each of which is housed inwardly of the said base portion by a concaved inner wall portion 6. The top of each arcuate insulation 5 is covered by a flat arcuate portion 7 which preferably is disposed somewhat below the upper end of the peripheral wall 4 and which is sealed both to the latter wall and to the inner wall portion 6, while vertical metal ends 8 adjacent to the ends of the arcuate insulations are sealed to the inner wall portion 6, the peripheral wall 4 and the false bottom 2.

The metal-clad arcuate insulations as thus provided are spaced uniformly along the periphery of the base portion and are of such lengths as to leave gaps between the opposed ends 8 of adjacent arcuate portions. Where only two of these arcuate portions are provided as in the drawings, these gaps are diametrically opposite each other.

The reservoir or container portion of my fountain, when in its operative position, comprises an inner can which consists of cylindrical wall 9 of a diameter freely fitting the bore of the arcuate inner wall portions 6, a false top 10 sealed to the top of this cylindrical wall, and a large and inverted can-shaped outer portion which includes a top 11 and a generally cylindrical wall 12. This outer wall 12 is less in height than the inner cylindrical wall 9 and is connected to the latter by a horizontal annulus 13 which is intercepted at two diametrically opposite points as hereafter described, and the space above this annulus and between the inner and outer cans is filled with heat-insulating material 14.

The outer can wall 12 has two diametrically opposite indentations 14 adjacent to its lower end, which indentations aline with the spaces betwen the ends 8 of the arcuate insulation lined parts of the base portion when the fountain is in use, so as to afford access to water in the wells disposed between the said ends 8. To insure the proper alining of the reservoir with the base portion and to latch these to each other, I provide L-shaped slots 15 at two diametrically opposite points on the inner can wall 9 below the annulus 13, which slots open at the lower end of this can wall. Each of these slots is slightly wider than the diameter of a latch-bar 16 which extends diametrically across the notched inner wall 6 of the base portion at right angles to the middles of the well spaces between the ends 8 of the said arcuate base parts. This rod is desirably supported by the two inner wall portions 6 and at such a height that the horizontally extending parts of the L-shaped slots 15 aline vertically with the latch-bar 16 when the container is seated on the base portion.

In using my poultry fountain, the container portion is inverted from its position of Fig. 1, and can readily be carried in its upwardly open position by means of a handled bail 17 swiveled to the exterior of the container. After the water is poured into the container, the base portion can be inverted and attached to the mouth of the container by merely setting it on the latter, rotating the base portion until the latch-rod alines with the vertical parts of the bayonet slots to let the base portion seat on the container, and then rotating the base portion to bring the latch-bar into alinement with the ends of the horizontal slot portions (as shown in Fig. 3).

When the filled fountain is inverted, water will flow from it into the two wells which aline vertically with the indentations 13, until the water in the wells reaches the tops of two apertures 18 which are formed in the inner container wall 9 at points somewhat above the lower end of that wall, each of these perforations being spaced about 90 degrees about the circumference of that wall from the free ends of the horizontal parts of the slots 15. The container then furnishes a constant level supply of water to the two wells, to which the chickens have access through the recesses 14.

When thus used, the supply portion of the water, namely that within the inner wall 9, is entirely jacketed by the insulation-filled hollow wall portions, while the two wells are similarly jacketed at their bottoms and ends. Consequently, only the top of the water in the wells and the exterior portion of this water is exposed to the cooling action of the air in cold weather, or to the heating action of hot air in summer. Since the amount of water thus exposed is quite small, and since this is automatically replenished with water from the container as fast as it is consumed by the poultry, I am able to keep the wells filled with water at a desirable temperature under ordinary conditions of use, regardless of changes in the temperature of the air.

Moreover, the water may be warmed in winter before pouring it into the container and the jacketing will keep it warm for a long period of time, so that I can keep the wells supplied with water at temperatures which are desirable for the proper development of the poultry. When the fountain is empty, a slight rotation of the container portion and subsequent lifting of the same detaches it from the base, as shown in Figs. 1 and 2. This affords free access to the interiors of both the container and the base portion for cleaning these, so that my poultry fountain can easily be kept in a thoroughly sanitary condition, which is also important for the health of the poultry.

To increase the sealing of the container portion to the base portion at points other than the water wells, I desirably make the peripheral base wall 4 of such a height that it extends somewhat above the arcuate base top portions 7, and also make this wall 4 of such a bore that the outer wall 12 of the container portion telescopically fits into it. However, I do not wish to be limited to this or other details of the construction and arrangement above disclosed, since many changes may be made without departing from the spirit of my invention or from the appended claims. For example, the container may have its annular shoulder part 13 seating on the flat and arcuate base top walls 7, with a little clearance space between the lower end of the outer container wall 12 and the top of the peripheral base wall 4, as shown in Fig. 4. Or, the opposed edges of the container wall 12 and the peripheral base wall 4 may abut as in Fig. 5, with clearance space between the parts 13 and 7. The clearance space in either case obviates the necessity of a commercially undesirable high degree of accuracy in the dimensions of the two fountain parts adjacent to their juncture. In either case, I desirably stiffen the mouth portion of the inner container wall 9 by providing this with flutes 20.

Nor do I wish to be limited to a two-well embodiment of my invention, or to the use of my invention in connection with the water supply for poultry.

I claim as my invention:

1. A poultry fountain comprising a base portion having a heat-insulating bottom and a plurality of arcuate heat-insulating lateral portions, the ends of the arcuate portions being spaced to afford upwardly open wells between them; a latch-bar extending across the base portion above the heat-insulating bottom; and an inverted container having spaced inner and outer walls and having its inner wall projecting downwardly beyond its outer wall, the container having a substantially annular horizontal shoulder portion connecting the lower end of its outer wall with the said inner wall, the downwardly projecting part of the outer wall having bayonet slots disposed for interlocking with the said latch-bar and having perforations respectively opposite the said upwardly open spaces; the outer wall of the container being indented opposite each of the said spaces to afford access to the said spaces from the exterior of the fountain.

2. A poultry fountain as per claim 1, in which the downwardly projecting inner wall part of the container extends within the bore of the said arcuate portions and in which the said annular container wall portion seats upon outward parts of the base portion and is snugly housed by a part of the outer wall of the base portion, whereby the container is substantially sealed to the base portion except for the said open spaces.

3. A poultry fountain as per claim 1, in which each arcuate insulating portion is inwardly housed by a metal wall portion, and in which the latch-bar is supported by the last named metal wall portions.

4. A poultry fountain as per claim 1, in which each arcuate insulation has its top housed by a flat arcuate upper wall and in which the outer wall of the base portion extends upwardly beyond these arcuate upper walls; the container having its said annular shoulder portion disposed below the top of the outer wall of the base portion, and the container having a peripheral flange adjacent to and above the top of the outer wall of the base portion.

5. A poultry fountain as per claim 1, in which each arcuate insulating portion is inwardly housed by a metal wall portion, and in which the latch-bar is supported by the last named metal wall portions, the container having its inner wall terminating slightly above the top of the heat-insulated bottom of the base portion, so that the container is supported only by the outward parts of the base portion on which the container seats.

6. A poultry fountain as per claim 1, in which the said indentations in its outer wall flare downwardly and open at their bottoms below the top of the outer wall of the base portion.

7. A poultry fountain comprising a cup-shaped base; a heat insulation disposed in the bottom of the cup, the said insulation including a flat bottom portion, and arcuate riser portions above that flat bottom portion and adjacent to the side wall of the cup-shaped base; metallic walls extending over the heat insulation and along the inner and end walls of the heat insulation, the said end walls being spaced to afford wells between them; an inverted container having spaced inner and outer walls connected by a horizontal and substantially annular shoulder portion, the inner wall of the container extending downwardly into the space between the metallic walls lining the inner faces of the arcuate insulation portions; the outer container wall having indentations disposed for simultaneously alining with the said wells; means for guiding the container with respect to the base to effect the said alining when the inverted container is set upon the base, and means for thereafter latching the container to the base.

Signed at Macomb, Illinois, May 11th, 1927.

JACOB T. LANDGRAF.